United States Patent
Sponheimer et al.

(10) Patent No.: US 9,776,527 B2
(45) Date of Patent: Oct. 3, 2017

(54) POWERTRAIN FOR ELECTRIC VEHICLES

(71) Applicant: FORD GLOBAL TECHNOLOGIES, LLC, Dearborn, MI (US)

(72) Inventors: Arnulf Sponheimer, Aachen (DE); Monika Derflinger, Aachen (DE); Roger Graaf, Vaals (NL); Marc Simon, Cologne (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 604 days.

(21) Appl. No.: 13/893,558

(22) Filed: May 14, 2013

(65) Prior Publication Data
US 2014/0343770 A1    Nov. 20, 2014

(51) Int. Cl.
B60L 15/20    (2006.01)

(52) U.S. Cl.
CPC ....... *B60L 15/2036* (2013.01); *B60L 2220/44* (2013.01); *B60L 2220/46* (2013.01); *B60L 2240/12* (2013.01); *B60L 2240/423* (2013.01); *B60L 2240/461* (2013.01); *B60L 2240/463* (2013.01); *B60L 2260/28* (2013.01); *Y02T 10/645* (2013.01); *Y02T 10/7275* (2013.01)

(58) Field of Classification Search
CPC ............. B60L 15/2045; B60L 15/2036; B60L 2220/44; B60L 2220/46; B60L 2240/12; B60L 2240/423; B60L 2240/461; B60L 2240/463; B60L 2260/28; Y02T 10/645; Y02T 10/7275
USPC ......................................................... 701/22
See application file for complete search history.

(56) References Cited

U.S. PATENT DOCUMENTS

| | | | | |
|---|---|---|---|---|
| 5,040,630 A | * | 8/1991 | Morishita | B62D 5/0463 180/446 |
| 5,453,930 A | * | 9/1995 | Imaseki et al. | 701/22 |
| 6,909,959 B2 | * | 6/2005 | Hallowell | 701/88 |
| 7,084,589 B1 | * | 8/2006 | Supina et al. | 318/139 |
| 7,467,678 B2 | * | 12/2008 | Tanaka et al. | 180/65.265 |
| 8,892,288 B2 | * | 11/2014 | Derflinger | B60L 11/123 180/65.1 |
| 2003/0078134 A1 | * | 4/2003 | Kojima | B60K 6/365 477/3 |
| 2011/0213519 A1 | | 9/2011 | Huber | |
| 2012/0197472 A1 | * | 8/2012 | He | B60K 6/105 701/22 |

(Continued)

FOREIGN PATENT DOCUMENTS

| | | |
|---|---|---|
| CN | 201177036 Y | 1/2009 |
| CN | 101602362 A | 12/2009 |

(Continued)

*Primary Examiner* — Yonel Beaulieu
*Assistant Examiner* — Angelina Shudy
(74) *Attorney, Agent, or Firm* — David B. Kelley; MacMillan, Sobanski & Todd, LLC

(57) ABSTRACT

A method for controlling a vehicle driveline includes connecting an electric motor to each of respective vehicle wheels, determining from driver input a magnitude of demanded wheel torque, determining speed of each wheel, using demanded wheel torque and the respective wheel speed to determine from a power loss map a current power loss for each motor, and transmitting power from the motor having the lowest current power loss to the respective vehicle wheel.

17 Claims, 2 Drawing Sheets

AWD in Wheel Motor

(56) References Cited

U.S. PATENT DOCUMENTS

| | | | | |
|---|---|---|---|---|
| 2014/0195079 A1* | 7/2014 | Derflinger | ............ | B60L 11/123 |
| | | | | 701/22 |
| 2014/0207355 A1* | 7/2014 | Akaho | ...................... | B60L 7/18 |
| | | | | 701/71 |
| 2016/0303996 A1* | 10/2016 | Sponheimer | ........ | B60L 15/2045 |
| 2017/0174097 A1* | 6/2017 | Gillespey | ............ | B60L 15/2045 |

FOREIGN PATENT DOCUMENTS

| | | |
|---|---|---|
| CN | 101659244 A | 3/2010 |
| CN | 101909918 | 12/2010 |
| CN | 101992770 A | 3/2011 |

\* cited by examiner

AWD in Wheel Motor

AWD Near Wheel Motor

AWD Transaxle Motor IWM Rear

AWD Transaxle Motors

POWERTRAIN FOR ELECTRIC VEHICLES

BACKGROUND OF THE INVENTION

1. Field of the Invention

This invention relates generally to an apparatus for high efficient distributed modular powertrain and optimum torque distribution control algorithm for electric vehicles.

2. Description of the Prior Art

In order to increase the driving range of an electric vehicle its powertrain must be highly efficient. For a state of the art electric powertrain the traction motor and its fixed gear transmission is designed to meet both performance and efficiency requirements. Whereas the performance criteria of a fully electric powered passenger car require high torque and power, the typical drive cycle of an electric vehicle is in the low torque and speed range. However, the state of the art traction motor has poor efficiency in this load range.

To gain higher efficiency of the powertrain in the typical drive cycle as well as for the homologation cycles, the traction motor's design must have rated power and torque output close to the load cycle. However, the performance criteria would be not fulfilled in this case, since they require higher rated torque and power.

One central electric motor used in an all electric vehicle has to be designed to cover the entire load range regarding acceleration, hill climbing and high speed requirements. However, a typical urban drive cycle as well as homologation cycles like UDDS, NEDC require the motor to be operated at low power and low torque profiles. Considering that the typical electric motor is designed to operate at its best efficiency near the rated power output, its best point of operation typically doesn't match with the homologation load paths. Designing the motor by setting up the best point of operation in the homologation cycle load path leads to lower torque output at high motor speed, which causes the motor to fail delivering enough torque in hill climbing or at high speed and high torque load scenarios.

A solution to this tradeoff is to use axle-wise distributed traction units designed for lower power output and to control them in a sufficient way. For low power operation only one axle is propelled. For high performance operation the second axle drive unit(s) are boosted in.

In case of different efficiency characteristics of front and rear powertrain units a drive control has been developed that operates the traction units in their optimum efficiency by optimized torque distribution between the drive units.

SUMMARY OF THE INVENTION

A method for controlling a vehicle driveline includes connecting an electric motor to each of respective vehicle wheels, determining from driver input a magnitude of demanded wheel torque, determining speed of each wheel, using demanded wheel torque and the respective wheel speed to determine from a power loss map a current power loss for each motor, and transmitting power from the motor having the lowest current power loss to the respective vehicle wheel.

For low power drive cycles, one motor designed for low power operation propels the vehicle with maximum efficiency enabling long distance drive and customer value. During high performance operation such as vehicle acceleration, hill climbing or high speed, additional wheel motors operate to produce high power and wheel torque, thereby boosting the vehicle's performance characteristics.

Distributed modular traction units like wheel hub motors occupy smaller packaging space needed for battery and other electric components.

Wheel hub motors, as part of a distributed powertrain, enable additional features like torque vectoring and better maneuverability in urban and city use for electric vehicles.

Using the new electric powertrain architecture the drive range of an electric vehicle increases significantly.

Battery capacity can be lower for the same range.

A direct comparison between an application having a single transaxle motor and an application having multiple, downsize wheel motors shows that the low power optimized hub motors better match the cycle load path with highest efficiency of operation relative to the transaxle motor application.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

The powertrain 10 relates to multiple drive units that are located at front and rear axles of a vehicle 11. The drive units replace a conventional electric powertrain represented by one inverter, one electric traction motor and a fixed gear transmission.

Figure 1A:
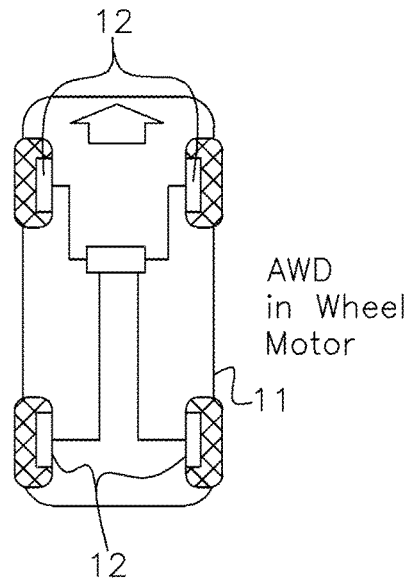
FIG. 1A is a schematic bottom view of a vehicle driveline having an in-wheel motor at each vehicle wheel.
Figure 1B:
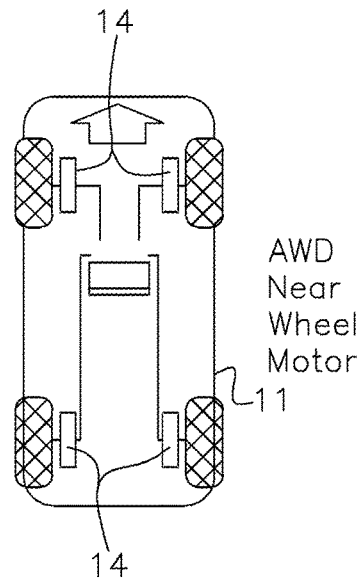
FIG. 1B is a schematic bottom view of a vehicle driveline having a near-wheel motor at each vehicle wheel.
Figure 1C:
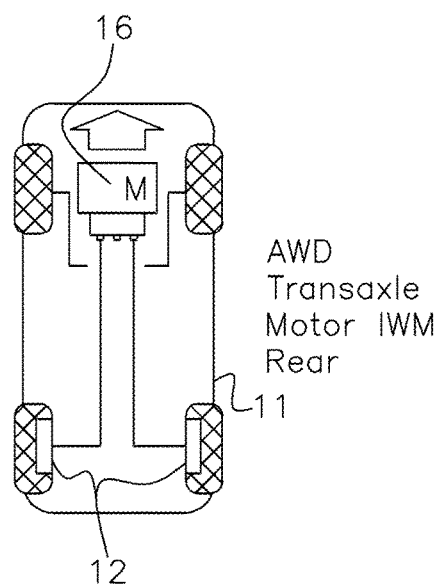
FIG. 1C is a schematic bottom view of a vehicle driveline having in-wheel motors at one axle and a transaxle motor at the other axle.
Figure 1D:
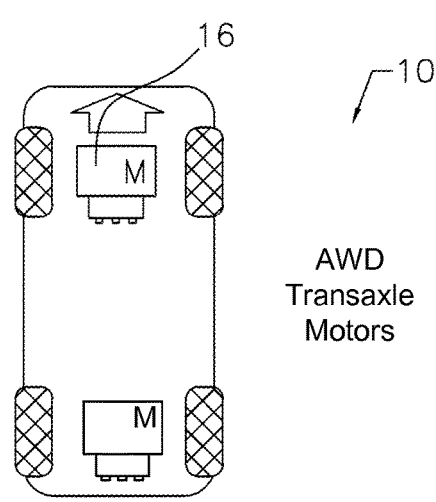
FIG. 1D is a schematic bottom view of a vehicle driveline having a transaxle motor at each axle.

The drive units may include four in-wheel motors 12 for all-wheel drive (AWD) vehicles, as shown in FIG. 1A; or four near-wheel motors 14 for AWD vehicles, as shown in FIG. 1B; or two in-wheel motors 12 and one transaxle motor 16 for AWD vehicles, as shown in FIG. 1C; or two transaxle motors 16 placed at front and rear axles, as shown in FIG. 1D.

The traction force is controlled via torque distribution of the front and rear axle drive units. A torque distribution algorithm 20 operates the front and rear axle drive units at their optimum efficiency. The control algorithm 20 identifies the most efficient drive unit and distributes the driver's requested torque accordingly. The control algorithm 20 can either control the vehicles traction forces with a fixed calibrated ratio, power based or efficiency based torque distribution.

Figure 2:
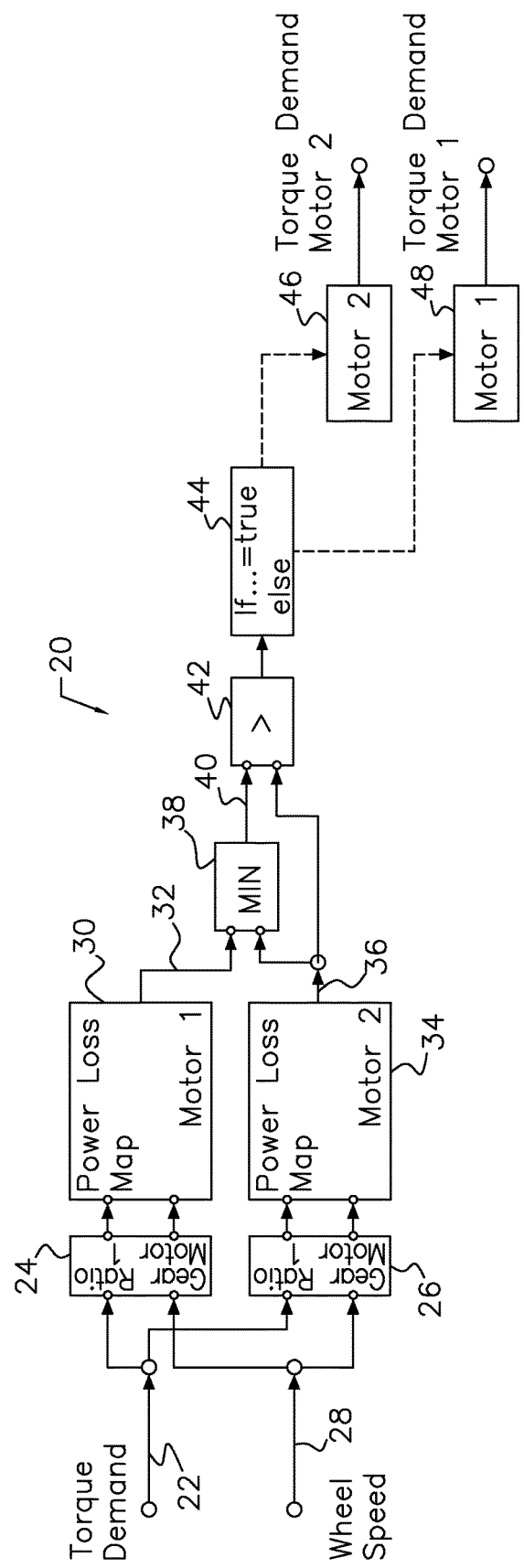
FIG. 2 is a flow diagram representing an algorithm for controlling the drive motors of the vehicle driveline.

FIG. 2 illustrates algorithm 20. The wheel torque demanded 22 by the vehicle operator, represented by a signal indicating the magnitude of accelerator pedal displacement is transmitted to a first and second controllers 24, 26, the first controller 24 controlling wheel motors 1 on a first vehicle axle, the second controller 26 controlling wheel motors 2 on a second vehicle axle. The motor(s) on one of the axles is(are) downsized compared to the motor(s) on the other axle—that is, the rated torque and power is lower for the motor power on one axle as compared to the motor power on the other axle.

Similarly, a signal representing wheel speed is supplied to controllers 24, 26. Controller 24 uses the demanded torque and wheel speed to index a power loss map 30 of the wheel motors 1 on the first vehicle axle. Controller 24 transmits a signal 32 representing the power loss of the wheel motors 1 on the first vehicle axle.

Controller 26 uses the demanded torque and wheel speed to index a power loss map 34 of the wheel motors 2 on the second vehicle axle. Controller 26 transmits a signal 36 representing the power loss of the wheel motors 2

A comparison of the power losses 32, 36 produced by controller 24, 26 is made at 38, where the minimum power loss is selected. A signal 40 representing the minimum power loss is transmitted to 42 as well as the signal 36 representing the power loss of the wheel motors 2 on the second vehicle axle, where a test is performed to determine whether the power loss 36 is less than the minimum power loss 40.

If at step 44 the result of test 42 is logically true, at step 46 the driver demanded wheel torque 22 is produced by the wheel motors 2 on the second vehicle axle. If the result of test 42 is false, at step 48 the driver demanded wheel torque 22 is produced by the wheel motors 1 on the first vehicle axle.

When the vehicle is operating in the homologation or city drive cycle load range, wheel motors on one of the vehicle axles can be downsized in rated torque and power in order to operate at its most efficient point. When performance operation of the vehicle is required all wheel motors are active in delivering combined torque and power to meet the performance requirement.

The drive unit should be designed such that it is disconnected from the driveline when it is inactive. This result is produced either (i) by using a clutch in the drive unit that opens the mechanical connection to the wheel shaft or (ii) by using an asynchronous electric traction machine (ASM) or a separately excited synchronous motor (SSM) that has no inducted drag torque when inactive.

In accordance with the provisions of the patent statutes, the preferred embodiment has been described. However, it should be noted that the alternate embodiments can be practiced otherwise than as specifically illustrated and described.

The invention claimed is:

1. A method for controlling a vehicle driveline, comprising:
providing at least one front motor, having a first rated torque, powering front axle wheels, and at least one rear motor, having a second rated torque different from the first rated torque, powering rear axle wheels;
transmitting power to the front or rear axle wheels based upon the front or rear motor having a lowest current power loss based upon demanded wheel torque and a wheel speed.

2. A method according to claim 1 wherein a current power loss for each motor is identified from a power loss map using the demanded wheel torque and the wheel speed for each wheel.

3. The method of claim 1, further comprising developing for each motor a power loss map that is indexable by the magnitude of demanded wheel torque and the speed of the respective wheel.

4. The method of claim 1, wherein transmitting power from more than one of the motors to the respective vehicle wheels, provided the magnitude of demanded wheel torque is greater than a torque able to be produced by one of the motors.

5. The method of claim 4, wherein the current power loss of each of the motors that transmits power to the respective vehicle axle wheels has a lower power loss than any of the other electric motors.

6. The method of claim 1, wherein transmitting power from two of the motors located on one of the front axle wheels and the rear axle wheels, provided the magnitude of demanded wheel torque is greater than a torque able to be produced by one of the motors.

7. The method of claim 1 wherein providing the at least one front motor comprises providing a pair of front motors, each powering one of two front wheels, and the rated torque of the pair of front motors is different from the second rated torque.

8. The method of claim 7 wherein providing the at least one rear motor comprises providing a pair of rear motors, each powering one of the two rear wheels, and the rated torque of the pair of front motors is different from the rated torque of the pair of rear motors.

9. The method of claim 1 wherein providing the at least one front motor comprises providing only one motor, having the first rated torque, that powers a pair of front wheels.

10. The method of claim 9 wherein providing the at least one rear motor comprises providing a pair of rear motors, each powering one of the two rear wheels, and the rated torque of the pair of rear motors is different from the first rated torque.

11. An electric vehicle, comprising:
at least one front motor, having a first rated torque, powering front axle wheels;
at least one rear motor, having a second rated torque different from the first rated torque, powering rear axle wheels;
a controller configured to permit transmission of power to the front or rear axle wheels based upon the front or rear motor having a lowest current power loss based upon a wheel torque and a wheel speed.

12. The electric vehicle of claim 11, wherein the controller is accessible to memory containing a power loss map for each motor, each of the power loss maps being indexable by the magnitude of demanded wheel torque and the speed of the respective wheel.

13. The electric vehicle of claim 11, wherein the controller is further configured to allow transmitting power from more than one of the motors to the respective vehicle wheels, provided the magnitude of demanded wheel torque is greater than a torque able to be produced by one of the motors.

14. The electric vehicle of claim 13, wherein the controller is further configured to require that the current power loss of each of the motors that transmits power to the respective vehicle axle wheels has a lower power loss than any of the other electric motors.

15. The electric vehicle of claim 11 wherein the at least one front motor comprises a pair of front motors, each powering one of two front wheels.

16. The electric vehicle of claim 15 wherein the at least one rear motor comprises only one motor that powers a pair of rear wheels.

17. The electric vehicle of claim 15 wherein the at least one rear motor comprises a pair of rear motors, each powering one of the rear wheels.

\* \* \* \* \*